Aug. 11, 1942.  C. S. RICHARDSON  2,292,581
BOLT FINISHING TOOL
Filed Sept. 17, 1941
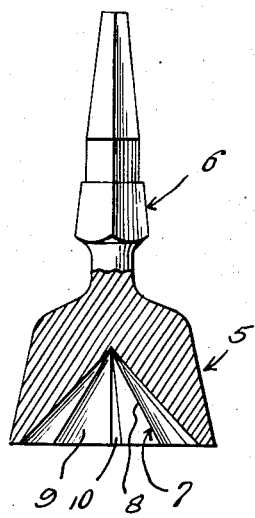
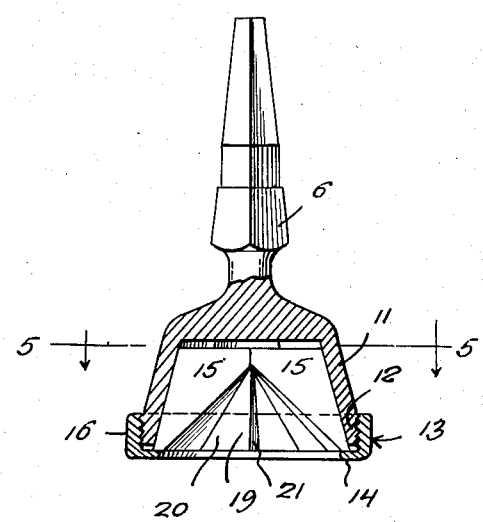
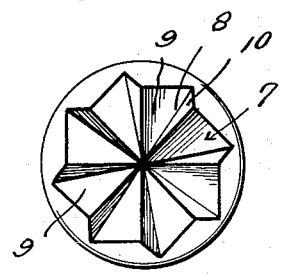
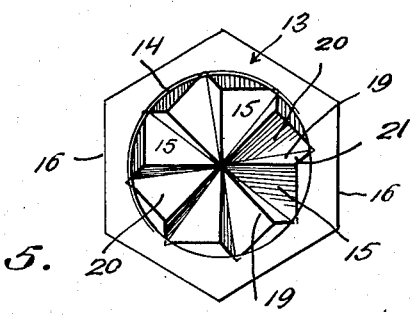
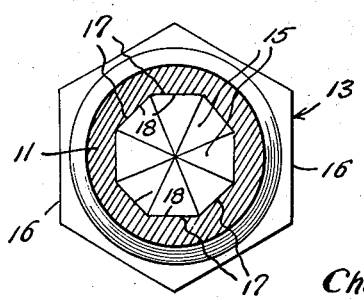
Inventor
Charles S. Richardson,
By McMorrow & Berman
Attorneys Patented Aug. 11, 1942

2,292,581

UNITED STATES PATENT OFFICE 2,292,581

BOLT FINISHING TOOL

Charles S. Richardson, Martinez, Calif.

Application September 17, 1941, Serial No. 411,220

3 Claims. (Cl. 29—103)

This invention relates to a bolt finishing tool, especially adapted for the proper shaping or rounding off of the end of a bolt after the threading thereof, heretofore either accomplished by hand filing after threading of the bolt by dies or on very expensively constructed and complicated machines when the bolts are manufactured in large quantities.

The primary object of this invention is the provision of a portable tool of the character stated which may be operated by a hand brace or a portable power driven chuck whereby a bolt after being threaded may be easily and quickly operated on for the purpose of rounding and smoothing off the end thereof to facilitate the threading of the bolt into a threaded hole or nut.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawing, in which Figure 1 is a side elevation, partly in section, illustrating a bolt finishing tool constructed in accordance with my invention.

Figure 2 is an end elevation illustrating the tool and also showing the cutters.

Figure 3 is a view similar to Figure 1 illustrating a modification of the invention.

Figure 4 is an end elevation illustrating the form of the invention shown in Figure 3.

Figure 5 is a sectional view taken on the line 5—5 of Figure 3 with the cutters removed.

Referring in detail to the drawing, the numeral 5 indicates a rigid metallic body provided with a slight external taper extending from one end to the opposite end thereof. Arranged axially and formed integrally with the small end of said body 5 is a chuck shank 6. The external shape of the body may be varied for adapting the tool to chucks now in use and especially the types found in hand braces, and portable power driven devices so that the present tool may be conveniently operated and will not require any alterations in devices now on the market for operating portable tools.

Extending inwardly from the large end of the body 5 is a substantially conical shaped recess, the walls of which are shaped to form a series of cutters 7, the cutting edges thereof being indicated by the character 8. As shown in Figure 2, each cutter is provided with a gradually sloping trailing face 9 and an abrupt advance face 10. Such faces along with the arrangement of the cutting edges will permit the tool to readily clear itself of cuttings. The group of cutting edges when brought into engagement with the end of a bolt and the body rotated will efficiently round off the end of the bolt with a smooth surface so that the bolt may readily enter a nut or screw threaded opening and the threads thereof move smoothly into the threads of said opening and nut on the rotation of the bolt.

A tool of this kind will be found extremely handy owing to the portability thereof and the ease with which it may be adapted to a chuck now in use either of a hand brace or a power driven device. Also, it will be seen that this tool will permit the efficient and rapid dressing of the end of a bolt after the threading thereof by a die, consequently providing a tool which will be desirable by anyone engaged in the threading or rethreading of bolts and having to thread said bolts home into a nut or threaded opening or recess.

In the form of the invention shown in Figures 1 and 2 the cutters 7 are of integral formation with the body 5. However, to facilitate the manufacture of this tool economically it is proposed, as shown in Figures 3 to 5, inclusive, to provide a body 11 of an external shape similar to the body 5 and having the shank 6 integral therewith. In this form of the invention the body 11 at its large open end is provided with external threads 12 to permit threading onto the body a nut 13 equipped with a retaining flange 14 projecting slightly over the open end of the body for the purpose of removably mounting in the body or the recess thereof a series of cutters 15.

It is preferable that the nut 13 have angularly related wrench-engaging faces 16 and of any number to permit the application of a wrench to the nut for the threading thereof on and off of the body 11.

The recess of the body 11 which opens outwardly through the large end of said body tapers gradually toward the closed end of said recess and the walls are angularly related, as shown at 17, and the cutters 15 have faces 18 shaped to match the faces 17 of the walls of the recess so that when the cutters are arranged within the body a driving connection will be established between the body and the cutters by the faces 17 and 18 fitting tightly with each other. Also it will be seen that the cutters are tapered to match the taper of the recess of the body 11. The cutting edges of the cutters 15 are indicated by the character 19 and each cutter has a trailing face 20 similar to the trailing faces 9 of the cutters 7 and further is provided with an abrupt advance face 21 similar to the faces 10 of the cutters 7.

The cutters are forced into the recess of the body 11 by the flange of the nut 13 when the latter is threaded onto the body until said cutters have a tight wedging action with the body and the faces 17 thereof, the inner ends of the cutters being slightly spaced from the inner end of the recess of the body, as clearly shown in Figure 3.

A construction of the body 11 and construction of cutters 15 will permit the tool to be economically manufactured and renders the cutters easily interchangeable with each other and renewable or repaired when damaged.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a portable tool for rounding and dressing ends of bolts after threading of the latter, a body provided with a tapered recess opening outwardly through one end thereof and having the walls of said recess angularly related to provide cutter engaging faces, cutter shaving faces to match the faces of said body and provided with cutting edges coacting in presenting a bolt end receiving recess, said cutters tapering toward one end to match the taper of the recess of the body, a shank integral with the other end of the body, and a retaining nut threaded on the body to releasably secure the cutters in engagement with the faces of the body.

2. In a portable tool for rounding and dressing ends of bolts after threading of the latter, a body provided with a tapered recess opening outwardly through one end thereof and having the walls of said recess angularly related to provide cutter engaging faces, cutters having faces to match the faces of said body and provided with cutting edges coacting in presenting a bolt end receiving recess, said cutters tapering toward one end to match the taper of the recess of the body, a shank integral with the other end of the body, and a nut having a series of angularly related wrench-engaging faces threaded on the body and including a flange engageable with the cutters to force the latter into wedging engagement with the faces of the body.

3. In a tool of the class described, a body adaptable to an operating chuck and having a recess, a series of removable cutters carried by said body within the recess and having cutting edges converging toward the inner end of the recess, said cutters having trailing and advance faces converging toward the inner end of the recess, with the trailing faces gradually sloping from the cutting edges and the advance faces extending substantially at right angles to the cutting edges, and means removably securing the cutters in the body.

CHARLES S. RICHARDSON.